3,341,704
SYSTEM FOR INVESTIGATING WORK FUNCTION DISTRIBUTION AND FIELD DISTRIBUTION OF A SURFACE BY ELECTRON BEAM SCANNING
Richard E. Thomas, Riverdale, Md., and George A. Haas, Alexandria, Va., assignors to the United States of America as represented by the Secretary of the Navy
Filed Feb. 7, 1966, Ser. No. 525,787
19 Claims. (Cl. 250—49.5)

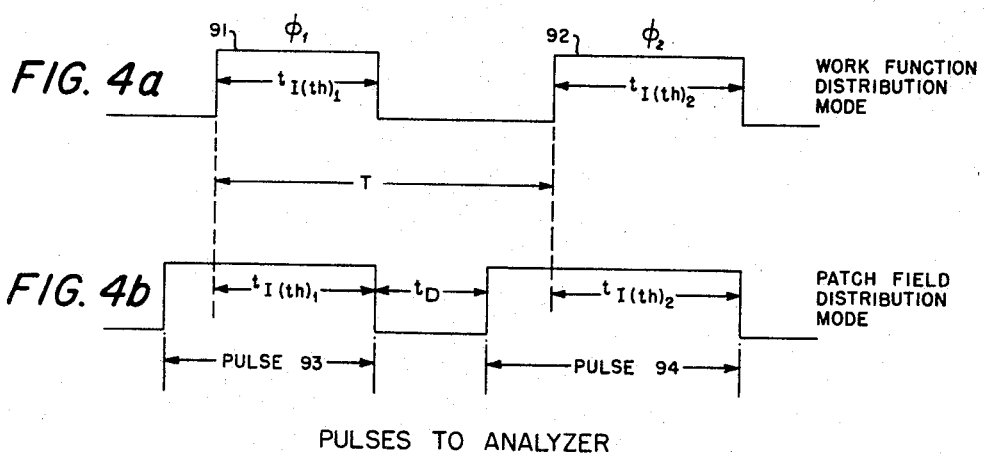
PULSES TO ANALYZER
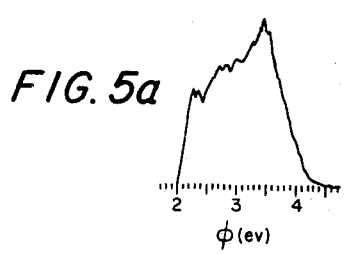
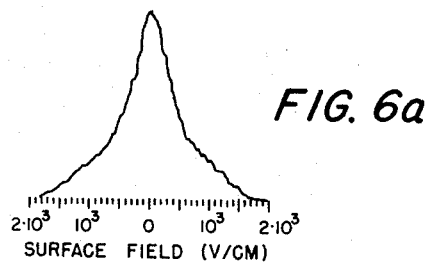
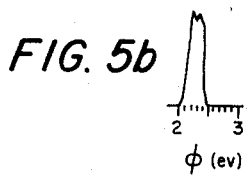
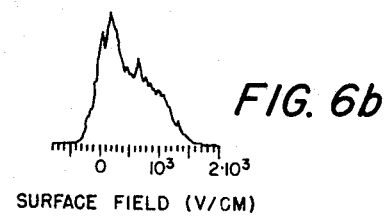

ABSTRACT OF THE DISCLOSURE

An electron beam scanning system for investigating the nonuniformity of the work function of a surface. The system operates in four modes as follows: (1) a viewing mode wherein light and dark areas on a kinescope indicate regions of different work functions; (2) a static mode wherein an electrometer measures the amount of current received from the beam by the surface; (3) a work function distribution mode wherein a plurality of channels indicate the numbers of points on the surface having given work functions; (4) a patch field distribution mode wherein the work function difference between adjacent points is measured.

---

The invention described herein may be manufactured and used by or for the Government of the United States of America for governmental purposes without the payment of any royalties thereon or therefor.

The present invention relates generally to a system for investigating the nonuniformity of work function of a material surface and more particularly to an electron beam scanning system for scanning a surface to be investigated to provide a display of the distribution in work function of the surface and the distribution of the electric field tangential to the surface, as well as a visual presentation of the work function variation of the surface itself.

Surface investigations of thermionic emitters have indicated the presence of nonuniformity of the surface work function. These investigations imply that the surface is not composed of a single value of work function but has many small regions known as "patches" having different and individual values of work function. Several techniques, such as those utilizing the electron emission microscope, have been employed in making detailed investigations of the variation in surface work function. All of the prior techniques have many disadvantages. One of the greatest disadvantages is that quantitative data, such as distribution plots of the surface work function and patch fields are not readily available automatically.

The general concept of this invention has been set forth in our copending patent application Ser. No. 414,483, filed Nov. 27, 1964, entitled Method and Apparatus for Investigating Variations in Surface Work Function, in which a scanning technique was disclosed which employed a scanning tube having the material to be investigated mounted as a target or anode. A small diameter electron beam whose energy is variable from zero to a few volts is directed at and scanned over the target. Electrons leaving the cathode of the scanning tube are accelerated, magnetically focused, deflected and then decelerated just before striking the target to cause the electrons in the beam to strike the target with near zero energy. The electrons are accepted or reflected depending on whether their energy is larger or smaller than the work function of the particular spot to which they are directed. A kinescope tube was provided to give a visual presentation of the work function variation, and an X-Y plotter was employed to provide a patch distribution of work function. To provide a patch distribution curve, the surface was scanned once at a given beam energy and the fraction of the total scan time during which the surface accepted electrons was recorded. The surface was then similarly scanned at a slightly higher beam energy and the fractional time was again recorded. The difference between the two times corresponds to the fraction of total area covered with work function within a given work function range.

By means of the present invention, a scanning and display system is provided having four alternate modes of operation. The first mode is a viewing mode wherein a kinescope display provides a visual presentation of the surface under investigation with light and dark areas indicating regions of different work function. The viewing mode is also useful in locating the portion of the target to be investigated. The second mode of operation is the static mode which is employed in making retarding potential plots of various spots on the surface. In this mode, an electrometer measures the amount of current received by the surface. Another application of the static mode is in determining thermionic emission characteristics of the surface. In this application of the static mode, the target is heated to emit electrons so that its effective work function may be determined. By means of a third mode of operation, a work function distribution plot is displayed at an analyzer having a plurality of channels. Each point on the work function distribution plot represents a stored count which indicates the number of spots or regions probed by the electron beam which have a given work function. By means of a fourth mode of operation, a patch field distribution curve is available wherein the work function difference between adjacent points is measured. Each point on the patch field distribution curve is indicative of the number of regions having a given work function difference or field. This mode can be utilized to measure average patch size from an analysis of the peak of the patch field distribution curve at zero field compared to the peaks at higher fields.

In order to obtain the work function distribution plot, the electron beam deflection is adjusted to scan a given surface area while in the viewing mode. The system is then switched into the work function distribution mode. The normal sweeping beam is momentarily stopped on a particular spot of the surface area being scanned by inserting a stepping pulse into the sweep circuit of the scanning tube and a sawtooth generator is employed to automatically increase the beam energy of the cathode or electron gun of the scanning tube for the length of the sawtooth voltage. A gate pulse is simultaneously applied to a plural channel analyzer until the current received by the surface of the sample reaches a threshold value. The length of the gate pulse determines the channel of the analyzer in which the pulse is stored. This time is proportional to the beam energy required to reach the current threshold of the surface spot being probed and is therefore proportional to the work function of that spot. The beam is then stepped to the next spot and the same procedure is repeated. Thus, samples of work function are recorded while the beam scans over the part of the surface being investigated. The resulting plot comprising all of the channels of the analyzer provides a work function distribution curve.

In the fourth mode of operation where a patch field distribution plot is provided by the analyzer, the gate pulse fed to the analyzer is controlled by a patch selector circuit which passes a threshold pulse to begin a gate pulse after a fixed delay. The gate pulse fed to the analyzer is turned off by the next threshold pulse. The patch selector circuit is controllable to allow selection of patches having work function less than a given value. The information regarding the change in work function between successive steps is stored and the distance between the steps is known so that it is possible to obtain a distribution of the patch fields over the surface.

Accordingly, an object of the present invention is to provide an improved system for investigating nonuniformity of work function of a material surface.

Another object is to provide an improved electron beam scanning system which automatically provides a work function distribution plot for a surface under investigation.

A further object is to provide a system for investigating the surface work function which may be employed to produce a field distribution plot wherein the difference in work function between adjacent points on the surface is measured.

Still another object is to provide a flexible electron beam scanning system for providing a work function distribution plot, a patch field distribution plot or a visual presentation of the variations in work function of a surface.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 4(a) represents a pair of pulses applied to the analyzer in the work function distribution mode;

FIG. 4(b) represents a pair of pulses applied to the analyzer in the patch field distribution mode;

FIG. 5(a) is a plot of the work function distribution of a particular surface;

FIG. 5(b) is a work function distribution plot of low work function regions for the same surface wherein higher work function regions have been excluded by means of the patch selector circuit of FIG. 2;

FIG. 6(a) is a plot of the complete patch field distribution of a randomly oriented surface; and FIG. 6(b) is a field distribution plot of the same surface where changes from high work function to low work function regions have been excluded by means of the patch selector circuit of FIG. 2.

Figure 1:
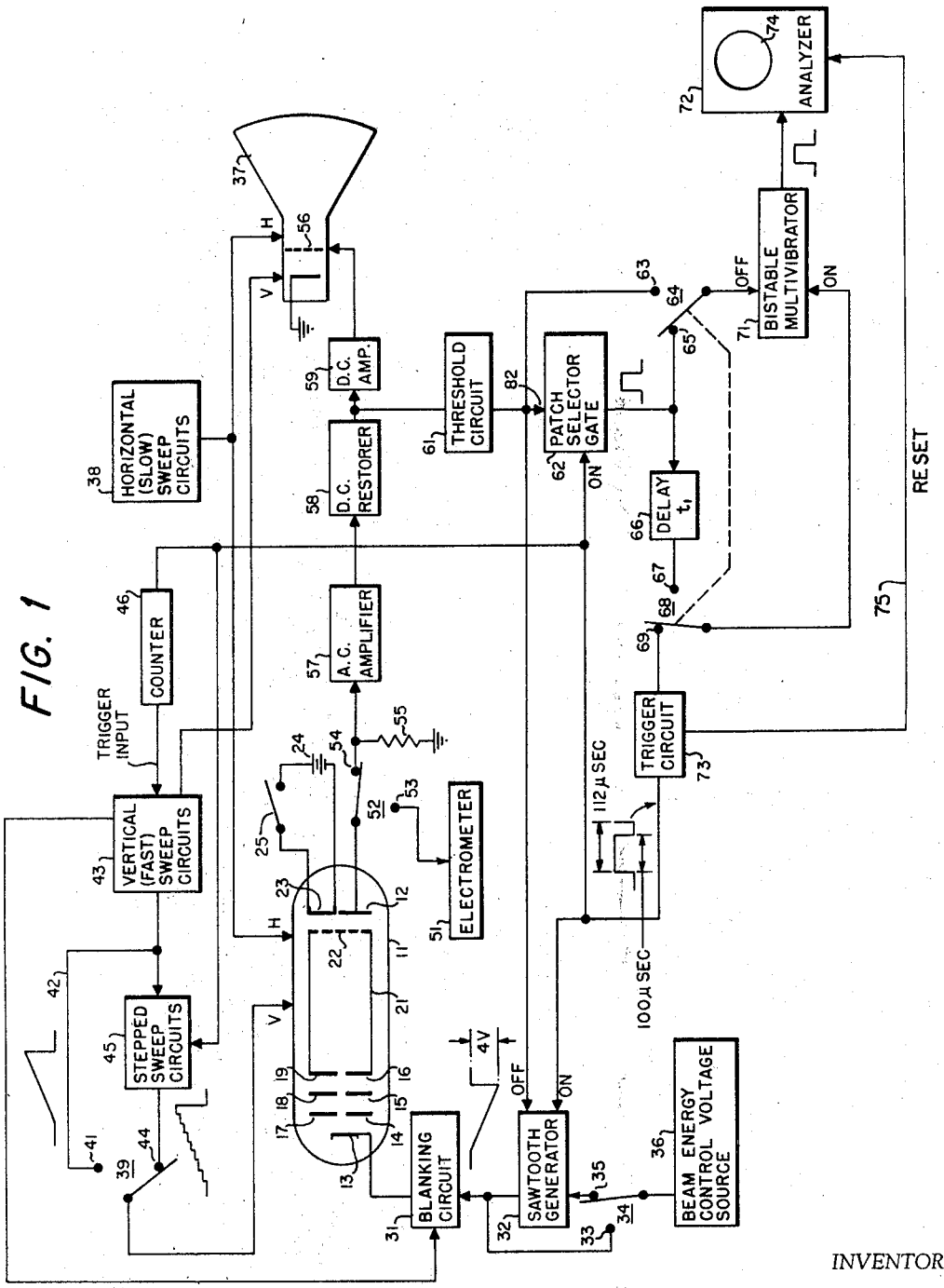
FIG. 1 is a schematic diagram of the system of this invention.

Referring now to the drawings, there is shown in FIG. 1 the scanning and display system of this invention including the scanning tube 11 having a material whose surface is to be investigated mounted as a target or anode 12. The beam scanning tube 11 of this invention is of the general type described and illustrated in our co-pending application referred to above. The tube includes an oxide cathode 13, a series of solid discs 14, 15 and 16, acting as grids and having apertures 17, 18 and 19, respectively, in their centers. The size of aperture 19 determines the resolution of the electron beam. A metal cylinder 21 is electrically connected at one end to grid 16 while the other end of metal cylinder 21 is connected to a fine mesh screen 22 of approximately 1,000,000 interstices per square inch. Grid 14 is normally connected to a source approximately 10 volts positive with respect to cathode 13 while grid 15 is biased by a 600-volt source and grid 16 by an 800-volt source. A ribbon 23 made of tungsten or any other suitable material serves as a work function reference and is externally connected to a voltage source 24 whenever switch 25 is closed in order to heat and clean the ribbon surface.

The beam scanning tube provides the proper environment for the electron gun or cathode, the beam forming electon optics, and the surface to be investigated. Each tube is individually constructed for the particular surface 12 to be investigated. The beam scanning tube is essentially used as a diode in the retarding field region with the surface to be studied acting as a collector or target. The target 12 is maintained at approximately ground potential whereas the cathode is biased with respect to ground by a voltage which establishes the beam energy or retarding potential. As the electrons leave the cathode, they are accelerated to approximately 800 volts and then are limited by aperture 19 which defines the beam size. The electrons pass through limiting aperture 19 and enter cylinder 21 acting as a drift space in which they are magnetically deflected and focused in a conventional manner. Focusing of the beam consists of imaging the limiting aperture on target 12 by means of an axial magnetic field which is approximately constant over the length of the drift space. The electrons pass through the 1,000 mesh screen 22 at the end of cylinder 21 and are decelerated as they approach the target surface. The 800-volt potential applied to the screen gives rise to a field of approximately 4,000 volts per centimeter in front of the target. This serves to overcome localized patch fields and therefore permits the observation of the finer detail that can be shrouded by these patch fields. In the typical beam scanning tube, a particular surface to be studied is affixed at anode 12. By adjusting the gain and centering controls of the sweep circuits of beam scanning tube 11, it is possible to scan the entire target surface, any small portion of it, or to actually stop the beam on any particular spot of the surface.

Scanning tube 11 has its electron gun or cathode 13 coupled through blanking circuit 31 to sawtooth voltage generator 32 and contact 33 of switch 34, shown as a single-pole double-throw switch. Blanking circuit 31 is connected to the vertical sweep circuitry from which it receives a pulse at the end of each vertical sweep at which time a blanking pulse is applied to cathode 13 of scanning tube 11 to reduce the beam current to zero. Sawtooth signal generator 32 is connected to contact 35 of switch 34 and is biased by a D.C. voltage level from adjustable beam energy control voltage source 36 which is coupled to the pole of switch 34. Hence voltage source 36 is coupled to sawtooth generator 32 or directly to cathode 13 through blanking circuit 31, depending upon the position of switch 34. The D.C. voltage from source 36 is variable and determines the zero reference of the sawtooth signal applied to cathode 13 for various work function ranges. Source 36 bypasses and inhibits sawtooth generator 32 in the viewing mode of the system, i.e., when only the kinescope 37 is utilized. In the work function distribution mode and in the patch field distribution mode sawtooth generator 32 is utilized to continually increase the beam energy of the electrons in the scanning tube for the duration of the sawtooth voltage, which in practice was chosen as approximately 100 microseconds.

Scanning tube 11 and kinescope tube 37 have their horizontal deflection circuits (H) connected in common to horizontal (slow) sweep circuits 38 which include a free-running sweep generator. The vertical and horizontal deflections of kinescope tube 37 are synchronized with the vertical and horizontal deflections, respectively, of the scanning tube 11. Vertical (fast) sweep circuits 43 are triggered by counter 46 after a predetermined number of trigger pulses are received from trigger circut 73, which is discussed below. The number of pulses received by counter 46 before an output pulse is applied to the vertical sweep circuits depends upon the desired number of work function samples to be taken for each vertical scan. A suitable frequency employed for the horizontal sweep is approximately ⅓ cycle per second while the frequency of the vertical sweep is approximately 200 cycles per second. The vertical deflection circuit (V) of tube 11 is connected to the pole of switch 39 while the vertical deflection circuit of kinescope tube 37 is driven directly from vertical sweep circuits 43. Contact 41 of a single-pole double-throw switch 39 is coupled through line 42 to receive a vertical sweep signal from vertical sweep circuits 43. Contact 44 of switch 39 is coupled through stepped sweep circuit 45 to vertical sweep circuit 43. In the viewing mode, switch 39 is positioned so that stepped sweep circuit 45 is not in the circuit and the normal sweep is applied to the vertical deflection circuit. The stepped sweep is utilized when either work function or patch field distribution plots are desired. The "steps" of the stepped sweep cause the electron beam directed from cathode 13 to anode or surface 12 to remain on a given spot of surface 12 for approximately the time duration of each step. A suitable time for each step is 100 microseconds.

The amount of electrons received by surface 12 may be detected by means of electrometer 51 when switch 52 has its pole coupled to contact 53. In all other modes of operation, the pole of switch 52 is coupled to contact 54 which in turn is coupled to resistor 55 across which a video signal is developed which is proportional to the amount of electrons received by surface 12. The signal developed across resistor 55 is applied to the grid 56 of kinescope tube 37 through an amplifier network comprising A.C. amplifier 57, D.C. restorer 58, and D.C. amplifier 59. Restorer 58 is a conventional circuit which provides a D.C. reference so that all signals are positive-going with respect to zero. It clamps the output of A.C. amplifier 57 to approximately zero so that the signals are positive-going for the beginning of the next sweep. The signal from D.C. restorer 58 is applied to D.C. amplifier 59 which provides a preselected reference level for biasing control grid 56 of kinescope tube 37. A threshold circuit 61 is coupled to receive the signal developed across resistor 55 through D.C. restorer 58 and produces a threshold pulse when the signal developed across resistor 55 reaches a preset amplitude or voltage level. The preset voltage level is adjustable and is related to a threshold current $I_{th}$ of the surface 12 as discussed below in relation to FIG. 3.

Threshold circuit 61 has its output coupled to the signal input 82 of patch selector circuit 62, to the OFF input of sawtooth generator 32, and to contact 63 of switch 64. The output of patch selector circuit 62 is coupled to contact 65 of switch 64 and to the input of delay circuit 66 which produces a delay $t_1$. The output of delay circuit 66 is coupled to contact 67 of switch 68. A bistable multivibrator 71 has its OFF input coupled to the pole of switch 64 and its ON input coupled to the pole of switch 68. Any other suitable bistable device may be substituted for bistable multivibrator 71 to produce the gate pulse 76. Switches 64 and 68 are ganged in actual operation and therefore operate in unison. The poles of switches 64 and 68 are applied to contacts 63 and 67, respectively, to obtain the patch field distribution curve at analyzer 72, while the poles of switches 64 and 68 are applied to contacts 65 and 69, respectively, to obtain the work function distribution curve at analyzer 72. The plural channel analyzer 72 may be any suitable analyzer such as the 400 channel transistorized analyzer manufactured by Radiation Instrument Development Laboratory (Model 34-128). The duration of the gate pulse received by analyzer 72 determines the channel of the analyzer in which a count is stored.

Figure 2:
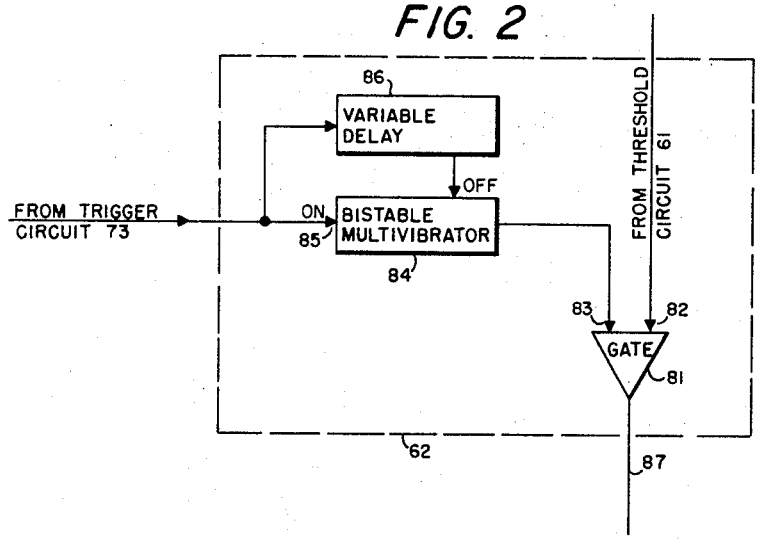
FIG. 2 is a schematic diagram of the patch selector circuit of FIG. 1.

FIG. 2 illustrates the patch selector gate 62 of FIG. 1 which comprises a gate 81 having a first input 82 for receiving a threshold pulse from threshold circuit 61. A second input 83 of gate 81 is coupled to the output of bistable multivibrator 84 having an ON input 85 for receiving the trigger pulse from trigger circuit 73. Any suitable bistable device may be employed in place of bistable multivibrator 84. A variable delay circuit 86 is coupled between the ON input and OFF input of bistable multivibrator 83. In operation, when a trigger pulse is received at the ON input of bistable multivibrator 84 an output signal is produced which opens gate 81 so that threshold pulses are passed to output 87 of gate 81. With delay circuit 86 set for a maximum or relatively long delay, all threshold pulses are freely passed. With patch selector circuit 62 adjusted for a shorter time, bistable circuit 84 turns OFF to inhibit gate 81. Threshold pulses arriving after that time are not passed by gate 81. The excluded threshold pulses correspond to threshold values beyond those of interest. Hence, the patch selector circuit may be employed to select only patches or regions below a given work function.

The times for the system is trigger circuit 73 comprising a free-running oscillator or any other suitable timing source which is coupled to the ON input of sawtooth generator 32, counter 46, the trigger input of patch selector circuit 62, the trigger input of stepped sweep circuit 45, and contact 69 of switch 68. The timer produces a trigger pulse which in practice is ON for 100 microseconds and OFF for 12 microseconds so that the period is 112 microseconds. Trigger circuit 73 also has a reset line 75 coupled to analyzer 72 to provide a reset pulse just before the beginning of each trigger period to reset the analyzer.

In operation, four modes of operation are possible, (1) the viewing mode, (2) the static mode for making retarding potential measurements and thermionic emission measurements, (3) the work function distribution mode, and (4) the patch field distribution mode.

VIEWING MODE

In the viewing mode of operation, switch 34 is positioned so that the adjustable voltage level of source 36 is applied to contact 33 of switch 34 and to cathode 13 through blanking circuit 31. The voltage from source 36 establishes the beam energy or retarding potential of the electron beam directed at the surface 12. Switch 39 is positioned so that its pole is applied to contact 41 to receive the signal from vertical sweep circuit 43. The step sweep circuit 45 is thereby disconnected and bypassed while the standard sweep is applied to the vertical deflection circuits of both the scanning tube 11 and kinescope 37 in this mode of operation. Switch 52 is positioned so that the anode or surface 12 is coupled through contact 54 to resistor 55. As the beam scans the surface 12, the amount of current received by the surface at a particular beam energy appears as a video signal across the resistor 55. This signal is amplified and used to modulate the beam of kinescope tube 37. Since the sweep circuits of both the beam scanning tube 11 and kinescope tube 37 are synchronized, the kinescope provides a continuous television display of the work function variation on the scanned surface. Bright areas correspond to regions where electrons enter the surface, that is, regions of the surface that have a work function lower than a particular beam energy employed, and the dark areas represent regions where electrons are reflected, that is, regions of the surface that have a work function higher than the particular beam energy.

The viewing mode can be used to determine the exact portion of the target to be investigated in either the work function distribution or field distribution mode. The magnification to be used and the region of the surface to be investigated are easily determined by means of the viewing mode. This is accomplished by adjusting the sweep amplitude and centering controls of the beam scanning tube until the region of the target is in view at kinescope 37. Another application of the viewing mode is for continuously observing surface phenomenon such as activation effects, migration, effusion, and adsorption, etc. In the viewing mode, the information generally desired is qualitative and no special effort is made to correlate degrees of brightness to work function with the accuracy desired in the other modes. Changes in work function as small as 50 millivolts are easily observable since the transition from a black to a white level on kinescope 37 are made to represent approximately ¼ volt change in beam energy (which is proportional to work function). In practice, when operating in the viewing mode, the beam energy, amplifier gain controls, and kinescope bias circuits, of course, are all adjusted so as to give the best contrast for whatever surface phenomenon is being observed.

STATIC MODE

Figure 3:
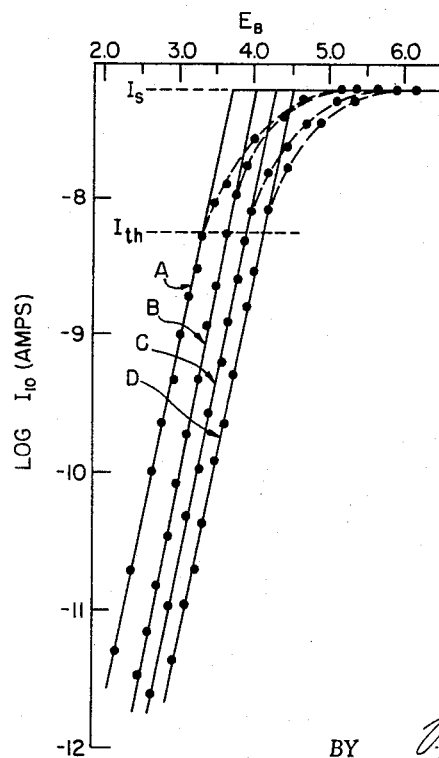
FIG. 3 illustrates a series of retarding potential plots of four different spots (A, B, C and D) of a surface under investigation.

In the static mode, the beam of electrons is stopped on a particular spot of target 12. Switch 52 is positioned so that target 12 is coupled to contact 53 of switch 52 so that the amount of electrons received by surface 12 may be monitored by electrometer 51. A typical retarding potential plot of four different points, A, B, C and D, of a surface are shown in FIG. 3. In the deep retarding field region, which usually begins about one order of magnitude below the saturation level, $I_s$, a set of linear parallel lines is always observed for different spots. The separation voltage of these lines is equal to the contact potential difference between the spots. Hence, the voltage required to reach the predetermined threshold current, $I_{th}$, in this deep retarding field region is a measure of the relative work function of the surface.

For the static mode of operation, sawtooth generator 32 is not in the circuit. The position of switches 64 and 68 is immaterial for the static mode of operation since that part of the circuit, including analyzer 72, is not being utilized during this mode.

Another possible application of the system when in the static mode is to determine the thermionic emission of the surface being investigated. This is accomplished by applying a positive potential at the cathode to stop all current to the target, then heating the target (which is usually in the form of a typical electron gun cathode with a heater behind it) and measuring its electron emission to screen 22 and cylinder 21. This is done when switch 52 is positioned as in the usual static mode so that target 12 is coupled to contact 53 of switch 52 and the amount of electrons emitted by surface 12 may be monitored by electrometer 51. The effective work function of the surface is thereby determined by this technique. Other types of thermionic measurements such as Schottky plots, Richardson plots, etc., may be made.

WORK FUNCTION DISTRIBUTION MODE

In this mode of operation switches 35, 39, 52, 64 and 68 are as illustrated in FIG. 1. In this mode the sawtooth generator signal is applied to cathode 13 and its zero reference is controlled by adjustable beam energy control voltage source 36. The relative work functions of different points are determined by the retarding potential technique. In this mode the position and energy of the electron beam is electronically varied. A trigger pulse is generated by trigger circuit 73 which is applied to the ON input of sawtooth generator 32, vertical sweep circuit 43, the ON input of patch selector circuit 62 and the ON input of bistable multivibrator 71. When the trigger pulse is generated, the vertical sweeping beam is stopped on a given spot at each step of the sweep. Sawtooth generator 32 is triggered so that a sawtooth voltage is applied to cathode 13 of the scanning tube 11 so that the beam energy is continuously increased from the deep retarding region for the duration of the sawtooth voltage for each spot probed. Simultaneously, bistable multivibrator 71 is turned ON to begin a gate pulse applied to analyzer 72. Similarly, patch selector circuit 62 is turned ON to allow passage of threshold pulses. As the cathode voltage increases, the electron beam energy increases until a threshold value $I_{th}$ of current is reached which is determined by a setting of threshold circuit 61 to coincide with a predetermined point on the curves as shown in FIG. 3. Ordinarily, the threshold value is one order of magnitude below the knee of the curves in the linear region as shown in FIG. 3. When the threshold current is reached, a threshold pulse is generated which immediately causes bistable multivibrator 71 and sawtooth generator 32 to be turned OFF, so that the pulse fed to analyzer 72 is terminated. The duration of the pulse fed to analyzer 72 by bistable multivibrator 71 determines the channel of analyzer 72 in which a pulse or count is stored. The pulse duration is proportional to the beam energy required to reach the threshold value and is also proportional to the work function of the spot that was probed. In operation, the height of the sawtooth waveform is adjusted to approximately 4 volts. If the analyzer has 400 channels, then each channel corresponds to a work function interval of approximately 10 millivolts. This procedure is repeated for the next succeeding spot so that approximately 30,000 samples of work function are recorded as the beam scans over the area of the surface under investigation in a time of 3 seconds. The resulting plot of the count stored in each channel as a function of a channel number is immediately available on oscilloscope face 74 of analyzer 72 and is called a work function distribution plot. A typical work function distribution plot is illustrated in FIG. 5(a). FIG. 5(b) illustrates the same work function distribution plot as in FIG. 5(a) but with surface spots having a work function above a given value excluded by patch selector circuit 62.

FIG. 4(a) is an illustration of the gate pulse train produced at the output of bistable multivibrator 71 which is applied to analyzer 72 in the work function distribution mode. The pulse 91 begins when a trigger pulse is received at the ON input of bistable multivibrator 71 and ends when the current received by the sample surface reaches the threshold value $I_{(th)}$ at a time $t_{I(th)_1}$. The work function of the surface spot being probed is proportional to the time duration of the pulse so that $$\phi_1 \propto t_{I(th)1} \qquad (1)$$

After a time T, another trigger is received at the ON input of bistable multivibrator 71 and simultaneously the beam steps to the next succeeding spot to be probed. The current reaches the threshold value at time $t_{I(th)_2}$ so that the work function of that spot is proportional to the time duration of pulse 92 which is given by $$\phi_2 \propto t_{I(th)2} \qquad (2)$$

and so on, for each additional spot probed. (It is to be noted that times $t_{I(th)_1}$ and $t_{I(th)_2}$ are measured with respect to the beginning of each trigger period.) The duration of each pulse determines the channel of analyzer 72 in which a count is stored in order to produce the work function distribution display as illustrated in FIG. 5(a). In the work function mode, patch selector circuit 62 is normally open at all times to pass the threshold pulses. However, as set forth above, patch selector circuit 62 can be adjusted so that it automatically turns OFF after a preselected time to exclude threshold pulses which would appear after a certain time so that spots having a work function above a given value are not counted.

PATCH FIELD DISTRIBUTION MODE

A patch field is defined as the electric field tangential to the surface where two adjacent patches have different work functions. The patch field is the difference in work function between the two adjacent spots comprising one step of the beam divided by the distance moved by the beam as follows:

$$F = \frac{\phi_2 - \phi_1}{d} \qquad (3)$$

where F designates the patch field, $\phi_1$ and $\phi_2$ are the respective work functions of two adjacent spots, and $d$ is the distance traveled by the electron beam from one spot to another and which is normally greater than the electron beam diameter.

In the patch field distribution mode, all of the switches 34, 39 and 52 are in the same position as shown in FIG. 1. Switches 64 and 68, however, are switched so that the pole of switch 64 is coupled to contact 63, while the pole of switch 68 is coupled to contact 67. In this mode, bistable multivibrator 71 is not turned ON by trigger circuit 73 but rather is turned ON by a threshold pulse which is delayed by a time $t_D$ from the end pulse 93 of FIG. 4(b). As can be seen from FIG. 1 trigger circuit 73 operates to trigger sawtooth generator 32, vertical sweep circuits 43 and patch selector gate 62 just as it did during the work function distribution mode. The duration of pulse 94 is proportioned to the difference in work function between the two spots. From FIG. 4(b)

$$\text{Pulse } 94 = T - t_D + t_{I(th)_2} - t_{I(th)_1} \quad (4)$$

where T is the system period (approximately 112 microseconds) and $t_D$ the delay time is usually set to 50 microseconds. Since both T and $t_D$ are constants and from Equations 1 and 2, it follows that $$\text{Pulse } 94 \propto \phi_2 - \phi_1 \quad (5)$$

Bistable multivibrator 71 is turned OFF when threshold circuit 61 produces the next threshold pulse. Hence bistable multivibrator 71 is ON for a time proportional to the time difference between successive threshold pulses. Since patch selector circuit 62 can be adjusted to turn OFF after a present time regardless of when a threshold pulse is received, spots of the surface having a work function beyond a preselected value can be eliminated by manual preselection and will not initiate a gate pulse.

FIG. 4(b) illustrates a gate pulse train produced at the output of bistable multivibrator 71 in the patch field distribution mode. Pulse 93 ends when the threshold value $I_{(th)}$ for the spot being probed is reached. After a delay $t_D$ produced by delay circuit 66, bistable multivibrator 71 is turned ON by delayed threshold pulse to begin pulse 94 for the next spot of the surface. Bistable circuit 71 is turned OFF by the next threshold pulse. $\phi_2$ is the duration of pulse 94 after receipt of the leading edge of a trigger pulse.

FIG. 6(a) is a field distribution plot wherein each point is indicative of the number of times a given field, or work function difference, is measured. Since the term $(T - t_D)$ of Equation 4 is normally equal to a constant 50 microseconds, this term represents the "zero" field position of the plot displayed by the analyzer. It is seen that the plot is symmetrical about "zero" for a randomly oriented surface since the probability of going from a patch of one work function to an adjacent patch of another work function is independent of scanning direction (up or down). The points on the plot to the right of the zero field point correspond to a progression from a lower work function patch to a higher work function patch, i.e., the term $(\phi_2 - \phi_1)$ of Equation 5 is positive, while points to the left of the zero field point correspond to a progression from a higher work function patch to a lower work function patch, i.e., the term $\phi_2 - \phi_1$ is negative.

The nature of the patch fields that exist near low work function patches is especially of interest since thermionic emission properties of a surface are primarily determined by the low work function patches. In order to examine the patch field distribution about low work function patches, the patch selector circuit 82 is set to exclude threshold pulses from regions having work functions higher than a preselected value so that a delayed trigger is not applied to the ON input of bistable circuit 71. However, it is to be noted that the threshold pulse always turns OFF bistable circuit 71 each time a threshold pulse is produced by threshold circuit 61. Thus, if the electron beam steps from a low to a high work function region, the patch field between the regions is measured, to give the plot shown in FIG. 6(b).

It is to be noted that either large or small regions of the surface under investigation can be analyzed as to the work function or field distribution by simply adjusting the sweep centering and gain controls. Also, any suitable analyzer may be used having any suitable number of channels depending on the resolution in work function and number of samples desired. It should also be noted that the voltages, frequencies, and pulse widths referred to are exemplary and that other suitable values may be utilized depending on the desired results.

Obviously many modifications and variations of the present invention are possible in the light of the above teachings. It is therefore to be understood that within the scope of the appended claims the invention may be practiced otherwise than as specifically described.

What is claimed and desired to be secured by letters patent of the United States is:

1. A system for investigating work function distribution of a surface comprising:
    scanning means for scanning the surface to be investigated with an electron beam,
    signal generator means coupled to said scanning means for periodically continuously increasing the energy of said electron beam,
    variable biasing means operatively coupled to selectively bias said signal generator,
    signal developing means coupled to said surface for developing a signal proportional to the amount of electrons received by said surface,
    sweeping means for controlling said electron beam,
    stepping means coupled between said sweeping means and said scanning means for stopping the electron beam on successive regions of said surface for a predetermined time,
    threshold means for monitoring the signal produced by said signal developing means and for producing a threshold pulse when a predetermined amplitude of said signal has been reached,
    a bistable circuit having an ON condition and an OFF condition coupled to said threshold circuit for producing a gate pulse having a duration defined by the time said bistable circuit means is ON, wherein said bistable circuit turns OFF upon receipt of said threshold pulse,
    trigger means for automatically energizing said signal generator, said sweeping means, and said stepping means, and for turning ON said bistable circuit, and
    a plural channel analyzer coupled to said bistable circuit for receiving said gate pulse from said bistable circuit means and for automatically providing a plot of the work function distribution of the surface being investigated.

2. A system as set forth in claim 1 wherein a visual display of the work function distribution is provided by said analyzer.

3. A system for investigating the work function distribution of a surface as set forth in claim 1 wherein said scanning means comprises a scanning tube having an anode comprising the surface to be investigated and a cathode as a source of said electron beam.

4. A system as set forth in claim 1 wherein said signal generator comprises a sawtooth generator for applying sawtooth pulses to said scanning means to continuously increase the electron beam energy for the duration of each sawtooth pulse.

5. A system as set forth in claim 1 further including a variable selector means coupled between said threshold means and said bistable circuit for turning OFF said bistable circuit after a preselected time to exclude threshold pulses produced after said preselected time.

6. A system as set forth in claim 5 further including:
    switch means for electrically bypassing said signal generator, and for directly coupling said beam energy control means to said scanning means,
    display means coupled to said signal developing means for providing a continuous visual presentation of the surface under investigation, and
    sweeping means coupled to said display means and synchronized with said sweeping means of said scanning means.

7. In a scanning system for investigating the surface of a material by progressively probing each spot of the material with a beam of electrons, the combination comprising:
- scanning means for scanning the surface to be investigated with an electron beam,
- a signal generator coupled to said scanning means for continuously increasing the electron beam energy for the time during which the beam is probing a given spot,
- threshold means coupled to said surface for monitoring the electrons received by said surface and for producing a threshold pulse when the current has reached a predetermined value,
- trigger means for periodically generating a system trigger pulse for triggering said signal generator means,
- gate pulse producing means coupled to said trigger means for beginning a gate pulse upon receipt of said trigger pulse and for ending said gate pulse upon receipt of a threshold pulse, said gate pulse having a duration defined by the time between receipt of said trigger pulse and receipt of said threshold pulse, and
- a plural channel analyzer coupled to said gate pulse producing means for receiving said gate pulse and for storing a count in a channel of said analyzer corresponding to the duration of said gate pulse so that a plot of the work function distribution of the surface is visually displayed by the analyzer as the entire surface is scanned.

8. In a system as set forth by claim 7, the combination further including variable selector means coupled between said threshold means and said gate pulse producing means for ending said gate pulse after a preselected time.

9. In a system as defined by claim 8, the combination further comprising:
- display means coupled to said surface being investigated for providing a continuous visual presentation of the work function variation of said surface.

10. A system for investigating the field distribution of a surface comprising:
- scanning means for scanning the surface to be investigated with an electron beam,
- signal generator means operatively coupled to said scanning means for producing a signal for periodically continuously increasing the energy of said electron beam,
- signal developing means coupled to said surface for developing a signal proportional to the amount of electrons received by said surface,
- sweeping means operatively coupled to said scanning means for controlling the position of said electron beam,
- trigger means for periodically generating a trigger pulse for automatically cycling said signal generator and said sweeping means,
- stepping means coupled between said sweeping means and said scanning means for stopping the electron beam on successive regions of the sample surface for a predetermined time,
- threshold means coupled to said signal developing means for monitoring the current received by said surface for producing a threshold pulse when a threshold value of current received by said surface has been reached,
- a bistable circuit having an ON condition and an OFF condition and coupled to receive said threshold pulse, said bistable circuit having an output for providing a gate pulse having a duration defined by the time said bistable circuit means is ON, wherein said bistable circuit is turned OFF by said threshold pulse,
- delay means coupled between said threshold means and said bistable circuit for receiving and delaying said threshold pulse to produce a delayed threshold pulse for turning ON said bistable circuit means,
- a plural channel analyzer coupled to the output of said bistable circuit means for receiving said gate pulse and for providing a plot of the field distribution of the surface being investigated.

11. A system as set forth in claim 10 further including variable biasing means for controlling the zero reference of the signal produced by said signal generator.

12. A system as set forth in claim 10 wherein a visual display of the field distribution of the surface under investigation is provided by the analyzer.

13. A system as set forth in claim 10 further including a variable selector means coupled between said threshold means and said delay means for selectively excluding threshold pulses produced after a preselected time.

14. A system for investigating the field distribution of a surface as set forth in claim 10 wherein said scanning means comprises a scanning tube having an anode comprising the surface to be investigated and a cathode as a source of an electron beam.

15. A system as set forth in claim 14 wherein said means coupled to said scanning means for applying a continuously increasing pulse to increase the energy of the electron beam comprises a sawtooth generator for applying sawtooth pulses to the cathode of said scanning tube wherein said electron beam energy is continuously increased for the duration of each sawtooth pulse.

16. A system for investigating the non-uniformity of a surface comprising:
- scanning means for scanning the surface to be investigated with an electron beam,
- signal generator operatively coupled to said scanning means for controlling the beam energy of said electron beam,
- signal developing means coupled to said surface for developing a signal proportional to the amount of electrons received by said surface,
- vertical and horizontal sweeping means operatively coupled to said scanning means for controlling the movement of said electron beam,
- stepping means coupled between said vertical sweeping means and said scanning means for stopping said electron beam on successive regions of said surface for a predetermined time,
- threshold means coupled to said signal developing means for monitoring the signal produced by said signal developing means and for producing a threshold pulse at its output when a predetermined amplitude of said signal has been reached,
- a variable selector circuit coupled to the output of said threshold means for passing to its output threshold pulses produced prior to a predetermined time,
- delay means having an input and an output with its input operatively coupled to the output of said selector circuit for delaying said threshold pulses passed by said selector circuit to produce a delayed threshold pulse as its output,
- bistable circuit means having an ON condition and an OFF condition for producing a gate pulse having a duration defined by the time said bistable circuit is in said ON condition, said bistable circuit operatively coupled to receive said threshold pulse,
- a plural channel analyzer operatively coupled to said bistable circuit means for receiving said gate pulse and for storing a count in a channel corresponding to the duration of said gate pulse,
- trigger means for automatically and periodically energizing said signal generator, said vertical sweep circuits, and said stepping means and said selector circuit, and coupled to said analyzer for resetting said analyzer,
- first switching means for operatively connecting said bistable circuit to either the output of said delay means or to said trigger means wherein said bistable circuit is turned ON either by a delayed threshold pulse or by a trigger pulse, respectively, and
- second switching means for operatively coupling said bistable circuit to either the output of said threshold means or to the output of said selector means, respectively, wherein said bistable circuit is turned OFF by said threshold pulse.

17. A system as set forth in claim 16 wherein said first and second switching means are operatively coupled to switch in unison.

18. A system for investigating the nonuniformity of a surface as set forth in claim 16 wherein said scanning means comprises:
  a scanning tube having an anode comprising the surface to be investigated and having a cathode as a source of electrons for emitting an electron beam toward said surface.

19. A system as set forth in claim 18 wherein said signal generator includes:

a sawtooth generator operatively coupled to apply a sawtooth pulse to said cathode for continuously increasing the electron beam energy for the duration of said sawtooth pulse.

References Cited
UNITED STATES PATENTS

| | | |
|---|---|---|
| 2,348,030 | 5/1944 | Snyder. |
| 3,103,584 | 9/1963 | Shapiro et al. _____ 250—49.5 |
| 3,235,727 | 2/1966 | Shapiro _____ 250—49.5 |

RALPH G. NILSON, *Primary Examiner.*

A. L. BIRCH, *Assistant Examiner.*